United States Patent [19]

Holler et al.

[11] 3,909,841

[45] Sept. 30, 1975

[54] SYSTEM FOR CONTROLLING THE RECORDING AND REPRODUCTION OF MESSAGES

[75] Inventors: Hermann Holler, Vienna; Gottfried Pammer, Maria Enzersdorf, both of Austria

[73] Assignees: Karl Vockenhuber; Raimund Hauser, both of Vienna, Austria

[22] Filed: Oct. 4, 1973

[21] Appl. No.: 403,625

[30] Foreign Application Priority Data

Mar. 29, 1973 Austria .............................. 2746/73

[52] U.S. Cl. ........................................ 360/3; 360/62

[51] Int. Cl.$^{2}$ .......................................... G11B 19/02

[58] Field of Search ............... 360/3, 71, 74, 61, 62; 352/25, 27; 192/46

[56] References Cited

UNITED STATES PATENTS

| | | | |
|---|---|---|---|
| 2,732,754 | 1/1956 | Foster et al. | 192/46 |
| 3,029,684 | 4/1962 | Wilkins et al. | 360/3 |
| 3,454,731 | 7/1969 | Hori et al. | 360/61 |
| 3,498,703 | 3/1970 | Gerry | 360/3 |
| 3,522,372 | 7/1970 | Adkisson et al. | 360/61 |
| 3,531,575 | 9/1970 | Kobler et al. | 360/74 |

*Primary Examiner*—Bernard Konick
*Assistant Examiner*—David K. Moore
*Attorney, Agent, or Firm*—Ernest G. Montague; Karl F. Ross; Herbert Dubno

[57] ABSTRACT

A sound recorder and reproducer, e.g., as used in combination with a motion-picture projector, can be placed in a recording mode by the operation of a record key and the setting of a switch-control member. The record key, when operated, or an actuating element displaceable thereby remains locked for at least a limited time to facilitate initiation of sound recording by a subsequent setting of the control member which preserves the enabling position until this member has been reset. The control member, which may be a pushbutton or a knob serving to start the film drive of the projector while completing the recording circuit, either blocks the return of the displaced actuating element by a delayed-action restoring mechanism or acts through a one-way coupling upon a detent for the record key to deactivate same on its resetting stroke.

18 Claims, 8 Drawing Figures

SYSTEM FOR CONTROLLING THE RECORDING AND REPRODUCTION OF MESSAGES

This invention relates to a recording or reproducing appliance, particularly to a sound-recording appliance, which comprises a mode control switch, which includes at least two controls, which control respective function control means and are operable to imitate one mode of operation of the appliance, preferably "recording," and holding means which are associated with at least one control and/or the corresponding function control means and adapted to maintain the operation thereof.

Magnetic sound recorders used in sound-recording motion-picture projectors are usually provided with means to prevent an unintended recording, which would involve an unintended erasing of an existing record. For this purpose two controls, such as keys or pushbuttons, are usually provided and must be operated at the same time to start the appliance in the recording mode. Particularly in sound-recording motion-picture projectors it is necessary for other reasons to operate two controls at the same time. For instance, a sound-recording motion-picture projector is known which on one housing surface carries record and playback keys and is provided on another housing surface with the mode-control switch for controlling the drive system. When it is desired, e.g., to record sound by means of a connected microphone, which is held by one hand of the operator to face a sound source, the operator should use his other hand to operate the record key and the desired drive-control key at the same time. This may be difficult even if these two keys are provided on one and the same surface of the housing. For design reasons it is often desired to provide these controls on different surfaces of the housing so that the operator either must lay down the microphone when he desires to start the appliance or must use an assistant.

The object of our invention, therefore, is to provide a simplified system for an appliance of the kind described, more particularly an apparatus for recording and reproducing sound, allowing the user to switch to a first operating mode (recording) with only one hand so as to leave his other hand free for the holding of a microphone or the like while preventing accidental switchover to this first mode from a normally established second mode of operation (reproducing).

We accomplish this object, pursuant to our present invention, by the combination of a normally reset control member such as a pushbutton or a knob settable to place the apparatus in either of its operating modes, depending on the condition of a switching circuit normally establishing the second mode, with an actuator such as a record key operable to place the switching circuit in an off-normal condition for the establishment of the first mode to the exclusion of the second mode upon a subsequent setting of the control member; this off-normal condition of the switching circuit is maintained by holding means responsive to the operation of the actuator until, upon a resetting of the control member, the holding means is disabled with the aid of release means linked with the control member. This simultaneous resetting of the control member and disablement of the holding means returns the switching circuit to a normal condition, establishing the second operating mode of the apparatus, concurrently with the restoration of the apparatus to an inactive state, as by deactivation of a drive for its message carrier.

According to a more particular feature of our invention, the holding means comprises a latch for locking the record key operated, the release means including a delayed-action mechanism for deactivating the latch and returning the record key to its unoperated position a predetermined delay period after it has been operated. The control member is provided with blocking means in engagement with the latch upon a setting of this member in the operated position of the actuator for disabling the mechanism until the control member has been reset.

In lieu of mechanical timing means such as the delayed-action mechanism just described, we may provide electrical timing means connected to the record key for the start of the delay period, in combination with coincidence means such as an AND gate having respective inputs connected to the timing means and to a circuit breaker coupled with the control member for emitting an output signal to the switching circuit in response to reversal of this circuit breaker during the delay period. A feedback path connected between the output and one of the inputs of the coincidence means maintains the output signals during the reversal of the circuit breaker independently of the timing means, i.e., beyond the expiration of the delay period until the control member is reset.

According to another aspect of our invention, the aforementioned latch is biased to engage the record key in its operated position, the release means comprising a one-way coupling effective to disengage the latch from the record key during resetting of the control member. This one-way coupling may include a rotary element joined to the control member for bidirectional entrainment thereby, the rotary element carrying a radial cam positioned to move a cam follower linked with the latch in a latch-releasing sense upon rotation of this element in a direction corresponding to a resetting movement of the control member. An axial cam on the same element is effective in the reset position of the control member to hold the cam follower out of engagement with the radial cam upon rotation of the element in an opposite direction, corresponding to a setting of the control member.

Alternatively, the one-way coupling may comprise a ratchet centered on an axis and a pawl coacting therewith, a support for this pawl being rotatable about this axis and joined to the control member for bidirectional entrainment thereby. The ratchet and the latch are linked by camming means releasing the latter in response to rotation of the ratchet about its axis.

The above and other features of our invention will now be described in detail with reference to the accompanying drawing in which.

Figure 1:
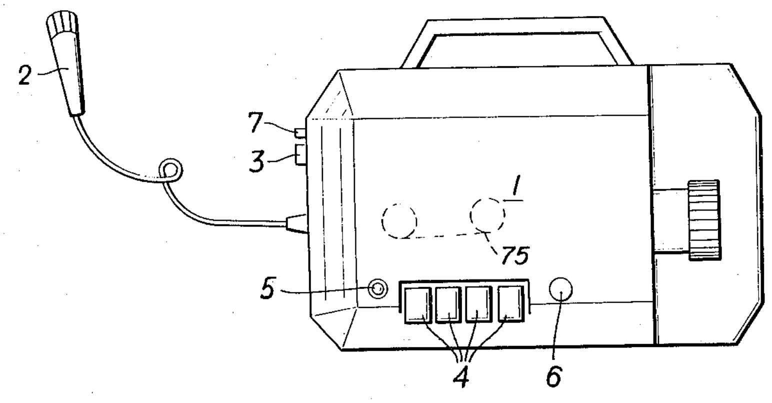
FIG. 1 is an elevational view of a sound-recording and sound-reproducing apparatus provided with our improved control system.

A sound-recording motion-picture projector 1 comprises an electric input for connection to a microphone 2 and is provided on one surface of its housing with a pushbutton-type record key 3 and on another surface of its housing with similar keys 4 for controlling the drive means of the projector, e.g., for feed and rewinding of a film (not shown) and of an accompanying sound carrier 75. A signal lamp 5 and a rotary knob 6 are provided for purposes which will be explained with reference to FIG. 2.

When it is desired to record sound on a processed film, the operator of the sound-recording motion-picture projector 1 will hold the microphone 2 to face a sound source, e.g., a person whose words are to be recorded. At the same time the operator is required to operate the record key 3 and one of the pushbuttons 4. It is apparent that he cannot do so unless he lays down the microphone 2 or an assistant is available. Even if the control 3 were on the same side of the housing as the controls 4 the operation would be difficult if an unlocking key 7 must be depressed simultaneously with the record key 3, as is often required. It will be understood that the same problem may arise not only with sound-recording motion-picture projectors but also with other magnetic sound recorders. It is therefore desirable to provide a mode of operation allowing the two keys 3 and 7 to be actuated first, this being followed within a short time by depression of one of the keys 4.

Figure 2:
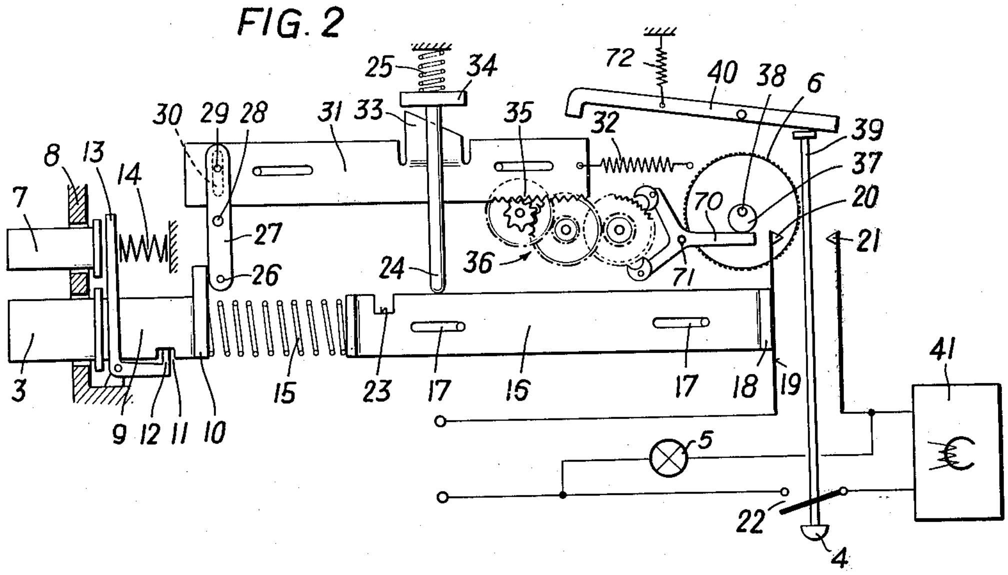
FIG. 2 is a somewhat diagrammatic view of an actuating mechanism for the apparatus of FIG. 1 in accordance with our invention.

FIG. 2 shows an embodiment of the invention comprising mechanical means facilitating this mode of operation pursuant to our invention. The record key 3 and the locking key 7 are disposed in apertures formed in a wall 8 of the housing of the projector 1. The record key 3 is connected to a key-operated plate 9 which at its opposite end is provided with a cheek 10. The plate 9 also has a notch 11 which is normally engaged by a lug 12 of a detent lever 13 urged by a compression spring 14 against the locking key 7. When the locking key 7 is pressed against the force of the spring 14, the detent lever 13 will turn in the clockwise sense so that the lug 12 leaves the notch 11 of the key-operated plate 9.

For this reason it is possible to press at the same time the record key 3, which by means of a compression spring 15 is operatively connected to an actuating slider 16 guided by pin-and-slot mountings 17. At its right-hand end as seen in FIG. 2, the slider has an angled portion 18 acting upon a relatively strong leaf spring 19 which terminates in a contact extension 20. The leaf spring 19 is included in a circuit which will be described hereinafter. The contact extension 20 is in register with a cooperating contact 21 and with the latter forms an enabling switch, which is connected in series with another switch 22 in the same circuit. The switch 22 is operable by one of the keys 4.

To hold the switch 20, 21 in operated condition even when the record key 3 has been released, the actuating slider 16 has a notch 23 engageable by a latch 24 which is biased toward that slider by a compression spring 25.

In response to the operation of the record key 3, the cheek 10 displaces a pin 26 which is secured to a two-armed lever 27. That lever 27 is rotatable about a pivot 28 and at its other end carries another pin 29 which engages in a slot 30 of an unlocking slider 31. In this arrangement, an operation of the record key 3 causes the lever 27 to turn in the counterclockwise sense about the pivot 28 so that the unlocking slider 31 is displaced to the left against the force of a tension spring 32. The unlocking slider 31 has a beveled dog 33 underlying an enlarged head 34 of the latch 24. When the unlocking slider 31 is displaced to the left, the dog 33 is moved out of the path of the head 34 so that the detent 24 is released to fall into the notch 23.

The unlocking slider 31 is provided at its right-hand end with teeth 35 which cooperate with a gear of a delayed-action mechanism 36 here shown to comprise an escapement pawl 70 rockable about a fulcrum 71. When the operator releases the record key 3, the compression spring 15, which is relatively soft compared to the leaf spring 19, returns the record key 3 to the position shown in FIG. 2 and the cheek 10 releases the pin 26. The escapement 36 delays the pulling of the unlocking slider 31 back to the right from its left-hand end position by the spring 32. This delay can be adjusted by means of an eccentric 37, limiting the swing of pawl 70, which has a shaft 38 carrying the handwheel 6 shown also in FIG. 1. As a result, the actuating slider 16 when operated by the record key 3 remains locked for a time which is sufficient to allow operation of the control key 4 after depression of the record key 3. As a result, a push rod 39 rigid with button 4 swings a locking lever 40 into the path of the unlocking slider 31. If the key 4 is depressed at this time, the locking lever 40 will prevent a complete return of the delayed-action mechanism to its normal position so that the latch 24 cannot be lifted by the ramp surface of the dog 33. If the key 4 is not operated, the actuating slider 16 will be released to open the switch 21, 22 when the time determined by the delayed-action mechanism 36 has expired.

The sound-recording means 41 of the motion-picture projector 1 are included in the circuit of the switches 20, 21 and 22. As the two switches are connected in series, as mentioned above, the recording means 41 cannot operate unless both switches are closed. When only the switch 20, 21 is closed to enable the recorder, only the signal lamp 5 connected in parallel with the switch 22 is lit and, once the record key 3 has been released, indicates to the operator of the appliance also whether or not the slider 16 has been unlatched to open the switch 20, 21. A restoring spring 72 anchored to lever 40 withdraws same from its blocking position upon the release of pushbutton 4.

Figure 3:
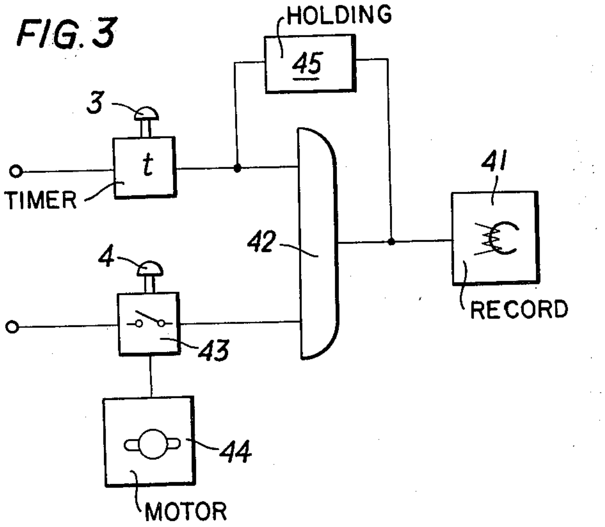
FIG. 3 shows a control circuit according to our invention to be used in the apparatus of FIG. 1 in lieu of the mechanism of FIG. 2.

Various timers are known and can be used in lieu of the escapement 36 of FIG. 2. FIG. 3 shows how the invention can be realized with strictly electric means. All components which are not essential for an understanding of the circuit arrangement have been omitted in this view. It will be understood that an embodiment as shown in FIG. 3 may also comprise a locking key 7, a signal lamp 5, etc.

According to FIG. 3 the recorder 41 is connected to the output of an AND gate 42 having one input connected to a timer *t*, which is controlled by the record key 3, and another input connected to a switching stage 43, which is controlled by the pushbutton 4 and by which a motor circuit 44 of the appliance can be energized. When only the key 4 is operated, the motor circuit 44 is energized, e.g. for playback of a previously recorded sound message, but the recording circuit 41 remains deenergized. When the record key 3 is operated to energize one branch of coincidence circuit 42 and the key 4 is then depressed within the time determined by the timer *t* to energize its other branch, the AND gate 42 will receive signals at both inputs to deliver an output signal which causes the recording circuit 41 to be energized. A holding circuit 45 provides feedback between the output of the AND gate 42 and its input connected to the timer *t*. When the AND gate 42 delivers an output signal and the set time has expired, the timer *t* need no longer deliver an input signal because the feedback ensures that the energization of the recording circuit 41 is maintained. The AND gate 42 will not deenergize the recording circuit until the circuit at the switching stage 43 is interrupted.

Figure 4:
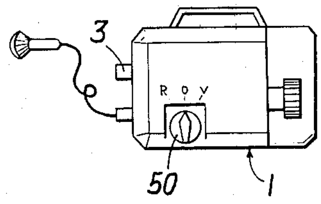
FIG. 4 is an elevational view similar to that of FIG. 1 but showing a slightly modified apparatus.

Another embodiment of the invention is shown in FIG. 4. The keys 4 are here replaced by a rotary switch 50 provided with a knob for moving the switch to several angular positions which are associated with respective modes of operation of the projector. The record key 3 is mounted on the rear side of the projector 1 and can be locked in its operated position.

Figure 5:
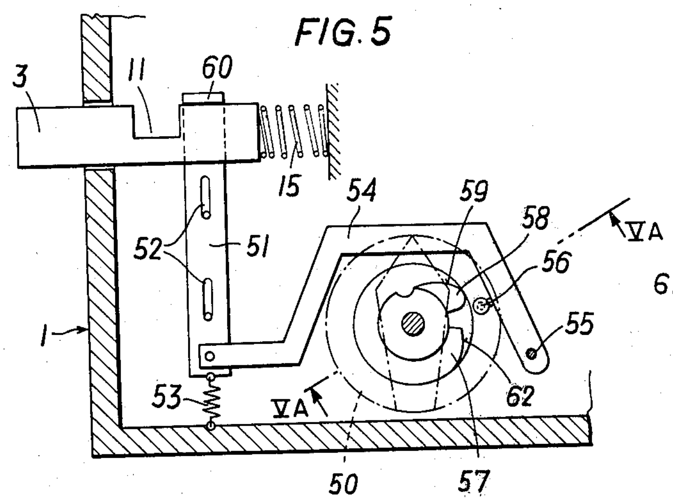
FIG. 5 shows part of an actuating mechanism according to our invention for the apparatus of FIG. 4.

According to FIG. 5 the record key 3 is again provided with a notch 11, which cooperates with a detent slider 51. The latter is slidable along a guiding pin-slot mounting 52 and is biased downward by a tension spring 53. A lever 54 is articulated to the slider 51 and at its other end is pivoted on a stationary fulcrum 55. Adjacent to the latter, the lever 54 carries a cam follower 56 which is engageable with a cam member 57 for controlling the rotary switch 50.

Figure 5A:
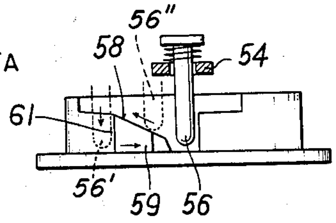
FIG. 5A is a sectional detail view taken on the line VA — VA of FIG. 5.

The cam member 57 comprises an axial cam 58 and a radial cam 59 (see also FIG. 5A) which serve to control the detent slider 51 for locking the record key 3 in its operated position in which an associated recorder is enabled by the closure of switch contacts as described above.

This arrangement has the following mode of operation:

It is assumed that a rotation of the switch 50 in the clockwise sense initiates the feed mode of the projector whereas a rotation in the counterclockwise sense initiates the rewind mode. When sound recording is desired, the record key 3 is operated first so that a lug 60 of the detent slider 51 biased by the spring 53 falls into the notch 11 to hold the key 3 in its operated position against the force of restoring spring 15. At the same time the lever 54 articulated to the detent slider 51 is swung counterclockwise about the pivot fulcrum 55 so that the cam follower 56 is moved to a position adjacent to the axial and radial cams 58, 59. When the rotary switch is now moved to its feed position, the radial cam 59 will not influence the follower 56 which is now aligned with the axial cam 58 so as to ride up its surface in a direction parallel to the axis of the cam member 57. The record key 3 remains locked. When the rotary switch is in the feed position, a step 61 in the axial cam 58 causes the follower 56 to drop behind that cam (see dotted-line position 56' in FIG. 5A) into the path of radial cam 59.

When it is desired to terminate the sound recording, the rotary switch 50 is turned in the counterclockwise sense to engage the follower 56 with the radial cam 59. The latter swings the lever 54 clockwise so that the detent slider 51 is raised against the action of the spring 53. The lug 60 releases the record key 3 so that the latter is returned to its initial position by the spring 15.

It would be basically possible to operate the record key 3 and the rotary switch 50 at the same time when a sound recording is to be initiated. The rotary switch has preferably an intermediate position between its neutral position and the feed position and the record key 3 can be locked operated also in this intermediate position (56'', FIG. 5A). In the embodiment shown in FIG. 5, the record key 3 when locked operated in the neutral switch position will be unlocked when the rotary switch is moved to its rewind position so that another radial cam 62 becomes effective. Alternatively, the film may be first scanned to find the frame where the recording of sound is to be initiated and the record key 3 may be operated only thereafter to enable a programmer which times the start of the sound-recording operation. To ensure that the switching click is not recorded, the film would have to be rewound to some extent, followed by a resumption of the feed. The recording of sound is then to be initiated at the preprogrammed frame thus located. During all steps of this procedure, the record key would have to be kept in its position of enablement. This may be accomplished in a simple manner in that the cam member 57 connected to the rotary switch 50 has also an axial cam, similar to cam 58, which is effective when the switch is in rewind position so that the cam follower 56 cannot unlatch the key 3.

Figure 6:
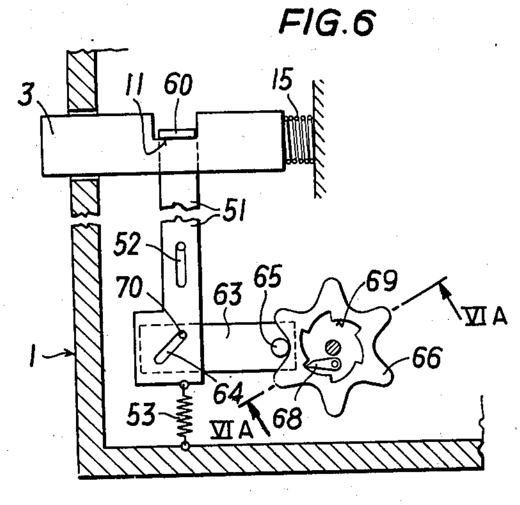
FIG. 6 is a view similar to FIG. 5, illustrating a modification.
Figure 6A:
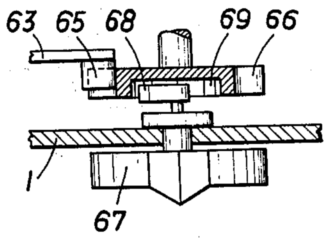
FIG. 6A is a sectional detail view taken on the line VIA — VIA of FIG. 6.

FIGS. 6 and 6A show another embodiment of the invention. The means for locking the record key 3 in its position of enablement are the same as in FIG. 5. The detent slider 51 is connected by an oblique slot to a rod 63 which carries a cam follower 65 for a cam wheel 66. The latter is coaxially secured to a manual rotary mode-control switch 67. A pawl 68 is eccentrically pivoted to the switch 67 and cooperates with internal teeth 69 of the cam wheel 66.

In the position shown in FIG. 6 the record key 3 is locked operated and sound can be recorded. The cam follower 65 lies in a depression of the cam wheel 66. The mode-control switch 67 can be turned counterclockwise so that the pawl 68 slips over the internal teeth 69. To terminate the recording of sound, the rotary switch 67 is turned clockwise so that the pawl 68 transmits the torque from the switch 67 to the cam wheel 66. As a result, the cam follower 65 rides up on a projection of the cam wheel and the rod 63 is shifted to the left in FIG. 6. A pin 70 transmits the movement of the rod 63 by means of the oblique slot 64 to the detent slider 51 so that the record key 3 is unlocked.

Numerous modifications are possible within the scope of the invention. As has been mentioned above, a one-way clutch used to control the locking of the record key may consist of any coupling which transmits torque in one direction whereas it does not transmit torque in the other direction. Where a timer is used, the same may be of a mechanical, electric or fluid-operated kind. Pneumatic locking means could also be used particularly because sound-recording motion-picture projectors always comprise a blower.

What is claimed is:

1. A system for controlling a normally inoperative apparatus having a first operating mode for the recording of sound on a carrier provided with normally inactive drive means and having a second operating mode for the reproduction of sound so recorded, comprising:

switching means normally establishing said second operating mode upon activation of said drive means;

a manually displaceable control member normally occupying a reset position, said control member having a set position for activating said drive means;

actuating means manually operable to place said switching means in an off-normal condition for establishment of said first operating mode to the exclusion of said second operating mode upon a subsequent setting of said control member to activate said drive means;

holding means responsive to operation of said actuating means for maintaining said off-normal condition; and release means linking said control member with said holding means for disabling the latter upon a resetting of said control member following a setting thereof in said off-normal condition of said switching means, thereby terminating said off-normal condition concurrently with deactivation of said drive means, timing means responsive to operation of said record key for maintaining said off-normal condition of said switching means for a predetermined delay period; and holding means coupled with said control member for continuing said switching means in said off-normal condition upon a setting of said control member during said delay period and for subsequently terminating said off-normal condition upon a displacement of said control member to said reset position.

2. A system for controlling an apparatus provided with switching means having an off-normal condition establishing a first operating mode for the recording of messages on a carrier and having a normal condition establishing a second operating mode for the reproduction of messages so recorded, comprising:

normally reset control means settable to place said apparatus in either of said operating modes depending on the condition of said switching means;

actuating means operable to place said switching means in an off-normal condition for the establishment of said first operating mode to the exclusion of said second operating mode upon a subsequent setting of said control means;

holding means responsive to operation of said actuating means for maintaining said off-normal condition of said switching means; and release means linking said control means with said holding means for disabling the latter upon a resetting of said control means following a setting thereof in said off-normal condition of said switching means, thereby returning said switching means to said normal condition.

3. A system as defined in claim 2 wherein said holding means comprises latch means for locking said actuating means operated, said release means including a delayed-action mechanism for deactivating said latch means and returning said actuating means to an unoperated position a predetermined period after operation thereof, said control means including blocking means engageable with said latch means upon a setting of said control means in an operative position of said actuating means for disabling said mechanism until the resetting of said control means.

4. A system as defined in claim 2 wherein said holding means comprises a circuit breaker coupled with said control means, electrical timing means connected to said actuating means for the start of a predetermined delay period, and coincidence means with respective inputs connected to said circuit breaker and to said timing means for emitting an output signal to said switching means in response to reversal of said circuit breaker during said delay period, said coincidence means being provided with feedback means for maintaining said output signal during reversal of said circuit breaker independently of said timing means.

5. A system as defined in claim 2 wherein said holding means comprises latch means biased to engage said actuating means in an operated position thereof, said release means comprising a one-way coupling effective to disengage said latch means from said actuating means during resetting of said control means.

6. A system for controlling a normally inoperative apparatus having a first operating mode for the recording of messages on a carrier provided with normally inactive drive means and having a second operating mode for the reproduction of messages so recorded, comprising:

switching means normally establishing said second operating mode upon activation of said drive means;

a manually displaceable control member normally occupying a reset position, said control member having a set position for activating said drive means;

a record key manually operable to place said switching means in an off-normal condition for establishment of said first operating mode to the exclusion of said second operating mode upon a setting of said control member to activate said drive means;

restoring means tending to return said record key to an unoperated position;

latch means coacting with said record key for locking same operated against the force of said restoring means; and release means for deactivating said latch means upon displacement of said control member from said set position to said reset position, thereby causing return of said record key concurrently with deactivation of said drive means.

7. A system as defined in claim 6 wherein said restoring means comprises a biasing spring.

8. A system as defined in claim 6 wherein said release means includes a one-way coupling between said control member and said latch means.

9. A system as defined in claim 8 wherein said one-way coupling comprises a rotary element joined to said control member for bidirectional entrainment thereby, a cam follower linked with said latch means, a radial cam on said element positioned to move said cam follower in a latch-releasing sense upon rotation of said element in a direction corresponding to movement of said control member from said set position to said reset position, and an axial cam on said element positioned for engagement with said cam follower in the reset position of said control member to hold said cam follower out of engagement with said radial cam upon rotation of said element in an opposite direction.

10. A system as defined in claim 8 wherein said one-way coupling comprises a ratchet centered on an axis, a pawl coacting with said ratchet, a support for said pawl rotatable about said axis and joined to said control member for bidirectional entrainment thereby, and camming means linking said ratchet with said latch means for releasing the latter in response to rotation of said ratchet about said axis.

11. A system for controlling a normally inoperative apparatus having a first operating mode for the recording of messages on a carrier provided with normally inactive drive means and having a second operating mode for the reproduction of messages so recorded, comprising:

switching means normally establishing said second operating mode upon activation of said drive means;

a manually displaceable control member normally occupying a reset position, said control member having a set position for activating said drive means;

a record key manually operable to place said switching means in an off-normal condition for establishment of said first operating mode to the exclusion of said second operating mode upon a subsequent setting of said control member to activate said drive means;

timing means responsive to operation of said record key for maintaining said off-normal condition of said switching means for a predetermined delay period; and holding means coupled with said control member for continuing said switching means in said off-normal condition upon a setting of said control member during said delay period and for subsequently terminating said off-normal condition upon a displacement of said control member to said reset position.

12. A system as defined in claim 11, further comprising adjusting means coupled with said timing means for varying said delay period.

13. A system as defined in claim 11 wherein said holding means comprises a circuit breaker coupled with said control member, coincidence means with first and second inputs respectively connected to said circuit breaker and to said timing means for emitting an output signal to said switching means in response to reversal of said circuit breaker during said delay period, and feedback means connected from the output of said coincidence means to said second input thereof for maintaining said output signal during reversal of said circuit breaker independently of said timing means.

14. A system as defined in claim 11 wherein said timing means comprises a delayed-action restoring mechanism for said record key.

15. A system as defined in claim 14 wherein said holding means comprises blocking means for disabling said restoring mechanism in the set position of said control member.

16. A system as defined in claim 15 wherein said record key is provided with latch means for locking same operated, said restoring mechanism being effective to release said latch means at the end of said delay period.

17. A system as defined in claim 11, further comprising signaling means controlled by said timing means to indicate said delay period.

18. A system as defined in claim 17 wherein said signaling means comprises a light source.

* * * * *